United States Patent
Akimoto

(10) Patent No.: US 7,855,023 B2
(45) Date of Patent: Dec. 21, 2010

(54) FUEL CELL, METHOD AND APPARATUS FOR MANUFACTURING FUEL CELL

(75) Inventor: Naomichi Akimoto, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/726,085

(22) Filed: Mar. 17, 2010

(65) Prior Publication Data
US 2010/0173207 A1 Jul. 8, 2010

Related U.S. Application Data

(62) Division of application No. 11/918,051, filed as application No. PCT/IB2006/000853 on Apr. 12, 2006, now abandoned.

(30) Foreign Application Priority Data

Apr. 13, 2005 (JP) ............................. 2005-115528

(51) Int. Cl.
*H01M 8/04* (2006.01)
(52) U.S. Cl. ...................................... 429/429; 429/428
(58) Field of Classification Search .................. 429/13, 429/34, 35, 37, 12, 428, 429, 433, 452
See application file for complete search history.

(56) References Cited

U.S. PATENT DOCUMENTS

| 4,345,009 | A | * | 8/1982 | Fahle et al. .................... 429/37 |
|---|---|---|---|---|
| 4,857,420 | A | | 8/1989 | Maricle et al. ................. 429/30 |
| 5,882,809 | A | | 3/1999 | McPheeters et al. ........... 429/30 |
| 6,190,793 | B1 | | 2/2001 | Barton et al. |
| 6,653,008 | B1 | | 11/2003 | Hirakata et al. |
| 2002/0142204 | A1 | * | 10/2002 | Prediger et al. ............... 429/32 |
| 2002/0142209 | A1 | | 10/2002 | Kikuchi et al. |
| 2004/0038118 | A1 | | 2/2004 | Steinfort et al. ............... 429/44 |
| 2005/0008927 | A1 | * | 1/2005 | Shiepe et al. .................. 429/44 |
| 2006/0166051 | A1 | * | 7/2006 | Murthy et al. ................. 429/13 |

FOREIGN PATENT DOCUMENTS

| DE | 100 56 534 A1 | 5/2002 |
|---|---|---|
| JP | 08-185875 A | 7/1996 |
| JP | 2002-358985 A | 12/2002 |
| JP | 2003-217622 A | 7/2003 |
| JP | 2004-079246 A | 3/2004 |
| JP | 2004-139905 A | 5/2004 |
| JP | 2004-227894 A | 8/2004 |
| JP | 2005-071804 A | 3/2005 |
| JP | 2005-071885 A | 3/2005 |
| WO | WO 2005/008826 A1 | 1/2005 |

* cited by examiner

*Primary Examiner*—Jennifer K Michener
*Assistant Examiner*—Carlos Barcena
(74) *Attorney, Agent, or Firm*—Kenyon & Kenyon LLP

(57) ABSTRACT

A fuel cell (stack or a single cell) includes a cell module to which an aging process that progresses initial creep has been applied such that creep during use is reduced compared with a cell module to which the aging process has not been applied. A manufacturing method of a fuel cell (stack or a single cell) includes an aging step for progressing through initial creep by applying at least a compression load to a cell module.

7 Claims, 4 Drawing Sheets

FUEL CELL, METHOD AND APPARATUS FOR MANUFACTURING FUEL CELL

BACKGROUND OF THE INVENTION

1. Field of the Invention

The invention relates to a fuel cell, a method and apparatus of manufacturing the fuel cell.

2. Description of the Related Art

Japanese Patent Application Publication No. JP-A-2002-35985 discloses a fuel cell stack. This fuel cell stack has an elastic member provided at one end thereof to compensate for changes in tightening load. In particular, the gradual loosening or reduction in tightening force, caused by, for example, thermal expansion and contraction, or creep in the lengthwise direction of the stack. The elastic member may be a disc spring, for example, which is able to compensate for changes in the tightening load by adjusting to changes in the lengthwise direction of the fuel cell stack that are within the effective stroke range of the disc spring.

When a tightening load is applied to the fuel cell stack over an extended period of time, however, creep of an adhesive layer between separators of the cell module or the like causes the fuel cell stack to contract in the direction in which the cell modules are stacked. If a carbon separator is used, creep of the binder resin of the separator itself may occur. If the extent of contraction exceeds the amount of fluctuation in tightening load that can be compensated for by the disc spring, it will not be possible to prevent further loosening or decrease in tightening force.

SUMMARY OF THE INVENTION

In view of the above, the invention provides a fuel cell capable of suppressing fluctuations in the length of a fuel cell stack or thickness of a single cell, a method of manufacturing such a fuel cell, and an apparatus for manufacturing the fuel cell.

A fuel cell according to a first example embodiment of the invention includes a cell module that has been subjected to an aging process that progresses initial creep in the cell module so that dimensional changes due to creep can be minimized.

According to the foregoing first aspect, an aging process is applied to the cell module before it is used so that creep of the stack during use of the fuel cell can be reduced. As a result, the necessary tightening load of the fuel cell stack can be maintained throughout the target lifetime of the cell module. This is because creep initially progresses rapidly (e.g., primary creep) but then slows down afterwards (e.g., steady-state creep). Thus, inducing creep through the initial stage may therefore be considered a rational approach because the process of progressing through initial creep can be completed relatively quickly.

Also, a manufacturing method of a fuel cell according to a second aspect of the invention includes an aging step for progressing through initial creep by applying at least a compression load to the cell module. According to this second aspect, providing an aging step for progressing through initial creep by applying at least a compression load to a cell module enables creep of the stack during use of the fuel cell to be reduced. As a result, the necessary tightening load of the fuel cell stack can be maintained throughout the target lifetime of the cell module. As described in the preceding paragraph, the process of progressing through initial creep can be completed quickly, as deformation during primary creep occurs rapidly before stabilizing.

In the aging step, the cell module may be subjected to a thermal load in addition to the compression load. In addition, a compression load may also be applied for predetermined period of time that is shorter than the target lifetime of the product. By applying a thermal load in addition to the compression load in the aging step, it is possible to both accelerate the progression of creep more so than when only the compression load is applied, and reduce creep during actual use in which there is a thermal load. In addition, it is possible to finish aging in a shorter period of time.

In this case, the predetermined period of time may be determined based on (i) the correlative relationship between an amount of change in the thickness of the cell module and the cumulative time over which the compressed load is applied to the cell module; (ii) the lower limit of the effective stroke of the elastic body provided in the stack; or (iii) the thermal contraction amount of the stack.

The thermal load may be applied by running a heated fluid through a fluid flow path of the cell module. Pressure may be applied to the heated fluid. Applying the thermal load by running a heated fluid through a fluid flow path of the cell module enables the thermal load to be applied easily, as well as in a state close to the state in which the cell module is actually used. Further, applying pressure to the heated fluid is effective for accelerating creep of the separator when the separator is a carbon separator.

The manufacturing method according to the second aspect may also include an aging step for progressing through initial creep by applying at least a compression load to a cell module after stacking, and an additional tightening step for additionally tightening the fuel cell stack after the aging step. The manufacturing method may also include an aging step for progressing through initial creep by applying at least a compression load to a cell module before stacking, and an incorporating step for incorporating the cell module in a stack after the initial creep has been progressed.

A third aspect of the invention relates to an apparatus for assembling a fuel cell in accordance with the second aspect of the invention. The apparatus performs the method of assembly, particularly the aging process, automatically.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, a fuel cell, which may be either a fuel cell stack or a single cell, and a manufacturing method thereof according to the invention will be described with reference to FIGS. 1 to 7.

Figure 1:
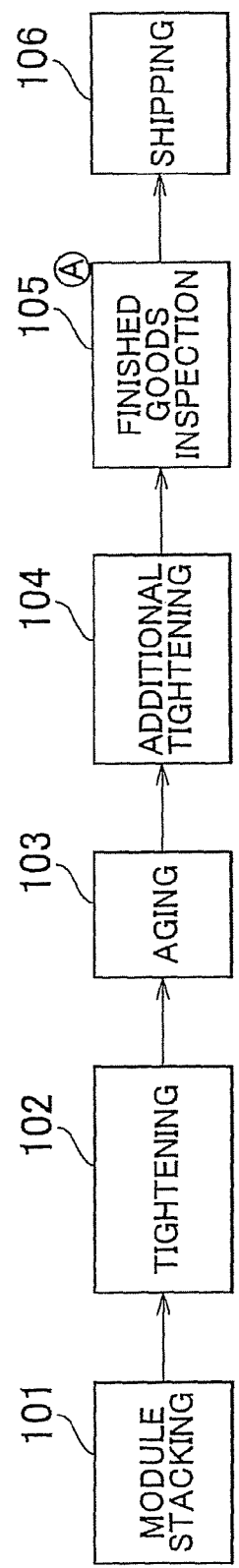
FIG. 1 is a flowchart of a manufacturing method of a fuel cell according to a first example embodiment of the invention.
Figure 2:
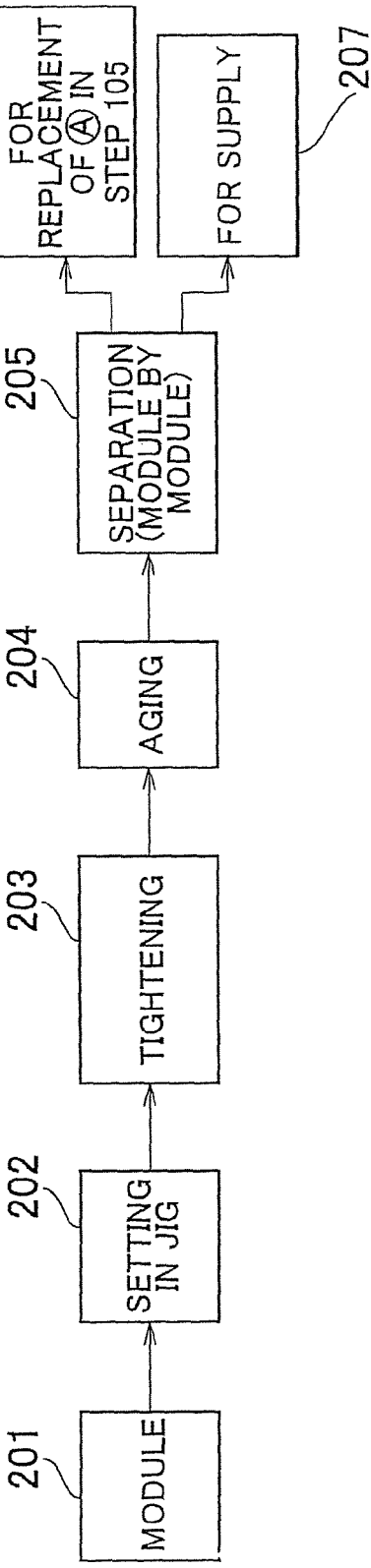
FIG. 2 is a flowchart of a manufacturing method of a fuel cell according to a second example embodiment of the invention.

FIG. 1 illustrates a fuel cell and a manufacturing method thereof according to a first example embodiment of the invention. FIG. 2 illustrates a fuel cell and a manufacturing method thereof according to a second example embodiment of the invention. FIGS. 3 to 7 can be applied to both the first and second example embodiments of the invention.

Like reference numerals will be used in both the first and second example embodiments of the invention to represent common or similar parts in the first and second embodiments of the invention.

First, a fuel cell (either a fuel cell or a single cell) and a manufacturing method thereof which are common or similar in the first and second example embodiments of the invention will be described with reference to FIGS. 1, 3, and 4 to 7.

The fuel cell that is the object of the fuel cell and manufacturing method thereof according to the invention is a proton-exchange membrane (PEM) fuel cell, for example. This fuel cell is mounted, for example, in a fuel cell vehicle, but may also be used in something other than a vehicle.

Figure 4:
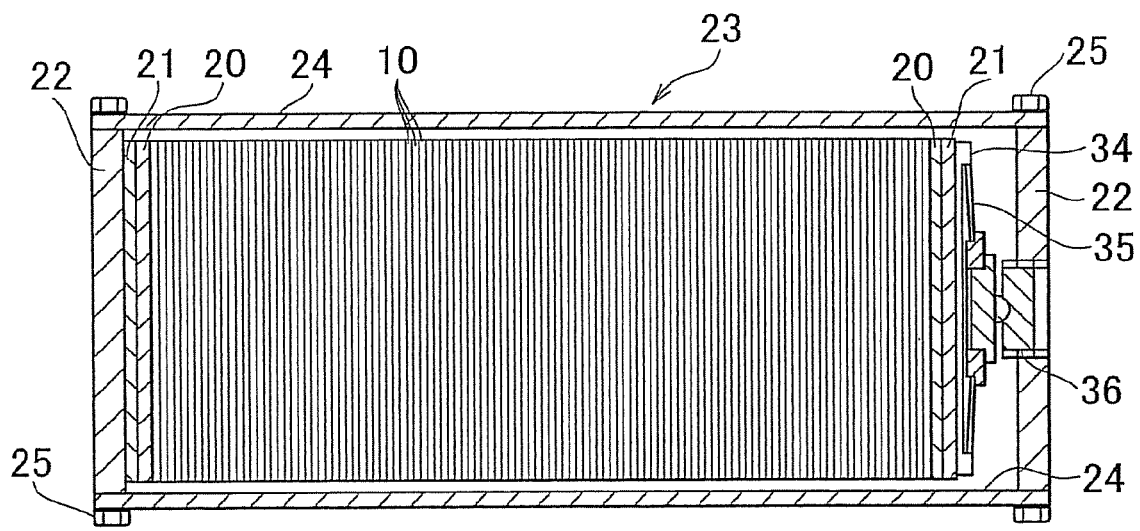
FIG. 4 is a side view of the fuel cell according to the first and second example embodiments of the invention.
Figure 5:
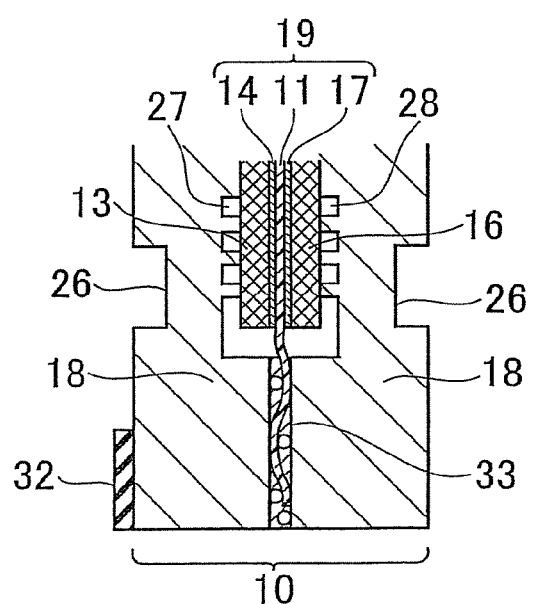
FIG. 5 is an enlarged sectional view of a portion of the fuel cell according to the first and second example embodiments of the invention.
Figure 6:
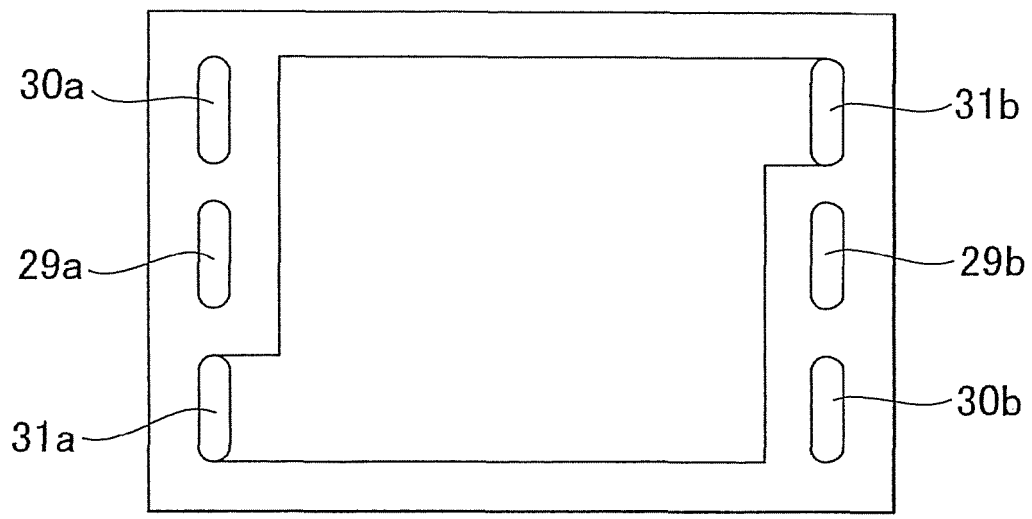
FIG. 6 is a front view of a cell incorporated into the fuel cell according to the first and second example embodiments of the invention.

As shown in FIGS. 4 to 6, the PEM fuel cell 10 is formed of unit fuel cells (also called "unit cells," "single cells," or simply "cells") in which a membrane-electrode assembly (MEA) 19 and a separator 18 are stacked together.

This membrane-electrode assembly includes an electrolyte membrane (also referred to as "electrolyte") 11 which is an ion-exchange membrane, an electrode (anode) 14 which is a catalyst layer arranged on one surface of the electrolyte membrane 11, and an electrode (cathode) 17 which is a catalyst layer arranged on the other surface of the electrolyte membrane 11. A diffusion layer 13 is provided on the anode side between the membrane-electrode assembly 19 and the separator 18, and another diffusion layer 16 is provided on the cathode side between the membrane-electrode assembly 19 and the separator 18. The separator 18 includes an anode side separator and a cathode side separator. A fuel gas flow path 27 for supplying a fuel gas (such as hydrogen) to the anode 14 is formed in the surface of the anode side separator 18 that contacts the diffusion layer 13, and an oxidizing gas flow path 28 for supplying an oxidizing gas (such as oxygen, normally air) to the cathode 17 is formed in the surface of the cathode side separator 18 that contacts the diffusion layer 16. Also, flow paths 26 for supplying a cooling medium are formed in the surfaces of the separators 18 opposite the surfaces that contact the diffusion layers 13 and 16.

A fuel cell stack 23 includes a plurality of cell modules, each of which includes at least one cell 10 (in a case where there is one cell to one module, the cell and the module are the same), that are stacked together to form a cell-stacked body. The cell-stacked body is sandwiched between terminals 20, insulators 21, and end plates 22 at both ends, in the cell stacking direction. The end plates 22 on both ends are fixed by nuts and bolts 25 to a tightening member 24 (such as a tension plate) which extends in the cell stacking direction on the outside of the cell-stacked body. A stack tightening load is applied in the cell stacking direction to the cell-stacked body.

An elastic body 35, such as, for example, a disc spring 35, is provided between the end plate 22 at one end of the fuel cell stack 23 and a pressure plate 34 to the inside of that end plate 22, and applies the tightening load to the stack. Thus, even if the length of the cell-stacked body fluctuates due to creep or thermal expansion and contraction or the like, that fluctuation is absorbed within the elastic deformation range of the elastic body 35 so that the tightening load does not change significantly. The initial value of the stack tightening load may be adjusted by, for example, rotating an adjustment screw 36, which is screwed into a hole provided in the end plate 22, around its axis and adjusting its position in the cell stacking direction.

On the anode 14 side of each cell 10, an ionic reaction takes place which splits the hydrogen into hydrogen ions (protons) and electrons. The hydrogen ions move through the electrolyte membrane 11 to the cathode side. Meanwhile, on the cathode 17 side of each cell 10, oxygen, the hydrogen ions, and the electrons (the electrons produced at the anode of the adjacent MEA pass through the separator, or the electrodes produced at the anode of the cell on one end in the cell stacking direction pass through an outside circuit and arrive at the cathode of the cell on the other side) combine in a reaction to produce water. This reaction is as follows.

Anode side: 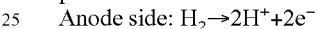
Cathode side: 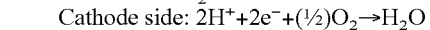

The separator 18 is a carbon separator, a metal separator, a metal separator that is combined with a resin frame, or a conductive resin separator.

The separator 18 includes, near its edge portion, an intake-side fuel gas manifold 30a, an exit-side fuel gas manifold 30b, an intake-side oxidizing gas manifold 31a, an exit-side oxidizing gas manifold 31b, an intake-side coolant manifold 29a, and an exit-side coolant manifold 29b. The fuel gas flow path 27 is formed in the surface of the anode side separator 18 that faces the diffusion layer 13. Similarly, the oxidizing gas flow path 28 is formed in the surface of the cathode side separator 18 that faces the diffusion layer 16. The coolant flow path 26 is formed in the surfaces of the separator 18 that are opposite the sides facing the diffusion layers.

The fuel gas flows from the intake-side fuel gas manifold 30a into the fuel gas flow path 27 and then out the exit-side fuel gas manifold 30b.

Similarly, the oxidizing gas flows from the intake-side oxidizing gas manifold 31a into the oxidizing gas flow path 28 and then out the exit-side oxidizing gas manifold 31b.

Also, the coolant flows from the intake-side coolant manifold 29a into the coolant flow path 26, and then out the exit-side coolant manifold 29b.

An adhesive layer 33 provides a seal around the fluid flow paths between separators or between the separator and the membrane of the cell 10. A gasket 32 or an adhesive is used to provide a seal between cell modules.

Creep occurs in the adhesive layer 33 and the separator 18, when the separator 18 is a carbon separator) when a stack tightening load is applied to the cell 10, as well as when a stack tightening load and a thermal load (an operating temperature of approximately 80 degrees Celsius) are applied to the cell 10, such as when the fuel cell is operating. As shown by line A in FIG. 3, the amount of deformation due to creep increases as the total operating time of the fuel cell stack 23 increases.

Creep of the cell-stacked body of the fuel cell stack 23 is not a problem as long as the amount is within the limits of absorption by elastic deformation of the elastic member 35 provided at one end of the fuel cell stack 23. If that amount of creep exceeds the limit of absorption by elastic deformation of the elastic member 35 (i.e., if it exceeds the effective stroke lower limit S of the disc spring 35 in FIG. 3), the electrical resistance between each cell 10 increases, as well as the electrical resistance between the separator 18 and the diffusion layers 13 and 16 in the cell 10. This results in a decrease in fuel cell output and the likelihood of leaking fluid is increased.

To reduce the chances of this problem occurring, the fuel cell (the stack 23 or the single cell 10) according to one example embodiment of the invention is a fuel cell (the stack 23 or the single cell 10) which includes a cell module is subjected to which an aging process that progresses initial creep before the cell module is incorporated into the fuel cell. As a result, creep over the useful life of the cell module is reduced compared with a cell module to which the aging process has not been applied.

Also, a manufacturing method of the fuel cell (the stack 23 or the single cell 10) according to one example embodiment of the invention is a manufacturing method of the fuel cell (the stack 23 or the single cell 10) which includes an aging step for progressing through initial creep by applying at least a compression load to a cell module before the cell module is incorporated into the fuel cell.

Aging may be applied to the stack 23 as a whole or to each single cell 10 separately.

The term aging refers to progressing through initial creep of the cell module by applying at least a compression load (either only a compression load, or both a compression load and a thermal load) for a predetermined period of time H to the cell module (either before or after stacking of the cell module). The compression load corresponds to a stack tightening load. The thermal load is a load applied to the cell module by increasing the temperature to, for example, the fuel cell operating temperature or a temperature that the cell can withstand which is above the fuel cell operating temperature.

Figure 3:
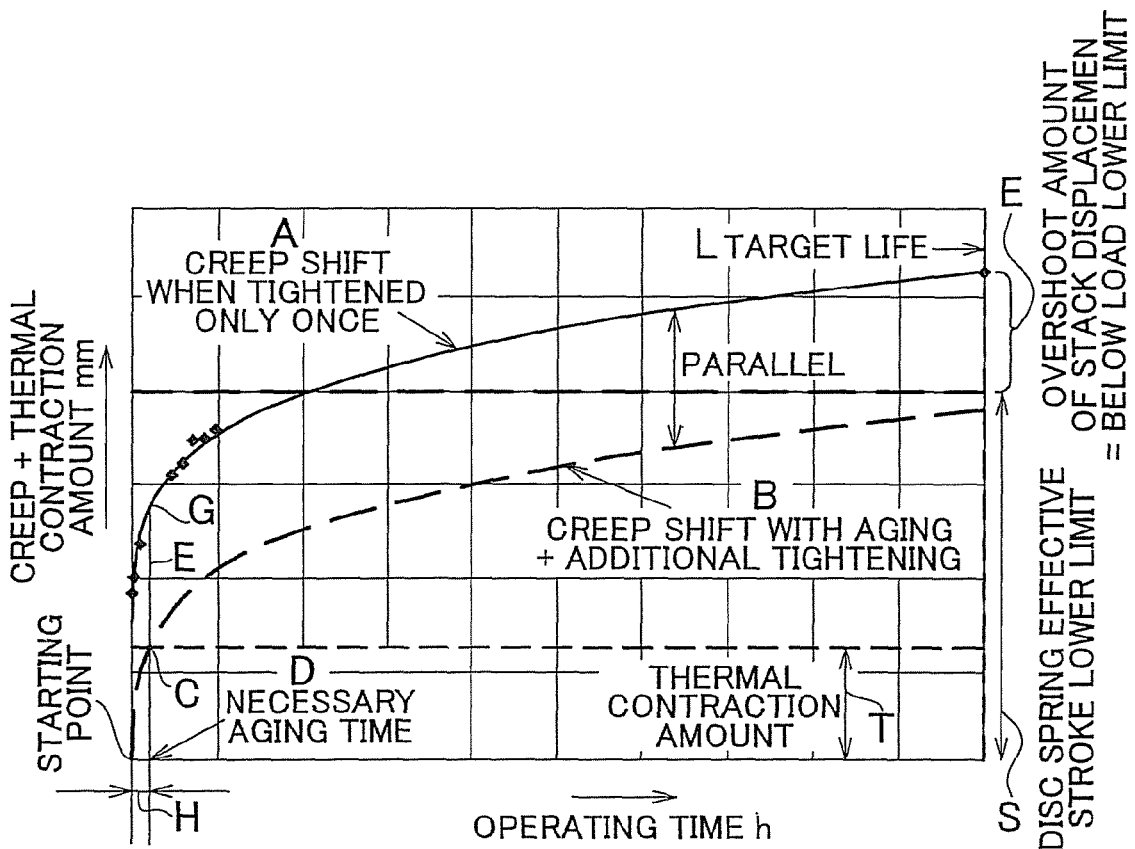
FIG. 3 is a graph illustrating a characteristic (creep+thermal contraction amount) versus (operating time) of the fuel cell and the manufacturing method thereof according to the first and second example embodiments of the invention.

Also, the predetermined period of time H may be a period of time determined based on the correlative relationship between an amount of change (creep+thermal compression amount) in the thickness of the cell module and the cumulative time h for which the compression load is applied to the cell module, as shown in FIG. 3.

The predetermined period of time H may also be a period of time determined based on an effective stroke lower limit of the elastic body (the disc spring in the illustrated example) of the stack 23.

The predetermined period of time H may also be a period of time determined based on the thermal compression amount of the stack 23 (or the cell module).

The predetermined period of time H can be obtained as shown in the graph of (creep+thermal compression amount) versus operating time h in FIG. 3, for example. That is, in the graph, a broken line B which shifts parallel to line A is drawn below line A. The distance between the two lines is a value equal to or greater than an amount E by which line A overshoots the effective stroke lower limit S (such as 4 mm with the stack) of the disc spring 35 at the target life L (for example, 5 years). A vertical line is then drawn which extends down from a point C, where the broken line B intersects with a thermal compression amount T (such as 1 mm with the stack), to the operating time axis. The predetermined period of time H can then be obtained as a value H on the operating time axis at a point D where this vertical line intersects with the operating time axis. The predetermined period of time H is, for example, between 20 and 50 hours, and more specifically, between 30 and 40 hours, i.e., it is short compared with the target life L (for example, 5 years).

Further, in the aging process, the thermal load can be applied to the cell module by running a heated fluid (hot water or gas heated to approximately 80 to 100 degrees Celsius) through the fluid flow paths 26, 27, and 28 of the cell module. Pressure may also be applied to the heated fluid. Applying both a compression load and a thermal load make it possible to progress creep in a short period of time More specifically, the following mode may also be employed.

(A) Creep is progressed by applying a thermal load to the cell module by circulating water that has been heated to the highest operating temperature through the stack coolant line. The, water may be pressurized such that a pressure load is also applied at this time. Also, nitrogen and air may be supplied into the, gas lines and pressurized. The pressure load is effective for progressing through initial creep (creep of a resin binder of a carbon separator) of a separator by applying pressure to the separator.

(B) In addition to the method described above, a method of applying temperature and compression loads by running hot water through both the coolant and gas lines may also be employed. Another method which may be employed is to apply temperature and compression loads to the cell module by conversely running a heated gas such as nitrogen through the coolant and gas lines.

(C) The fuel cell may be operated to generate power and temperature and compression loads applied to each cell/module at that time. When operating the fuel cell to generate power, a voltage increase effect (a conditioning effect) can also be expected, in addition to progressing through initial creep, due to catalyst activation and an appropriate amount of moisture being applied to the electrolyte membrane.

(D) A method of applying temperature and compression loads by placing the stack in a thermostatic chamber or furnace may also be applied.

Next, the operation and effects of the fuel cell (the stack 23 or the single cell 10) and the manufacturing method thereof according to the first and second example embodiments will be described.

With the foregoing fuel cell (the stack 23 or the single cell 10), an aging process is applied to the cell module before it is used. As a result, creep of the fuel cell (the stack 23 or the single cell 10) while it is being used can be reduced.

Also, the foregoing manufacturing method of the fuel cell (the stack 23 or the single cell 10) includes an aging step for progressing through initial creep by applying at least a compression load to a cell module. As a result, creep of the fuel cell (the stack 23 or the single cell 10) while it is being used can be reduced.

Figure 7:
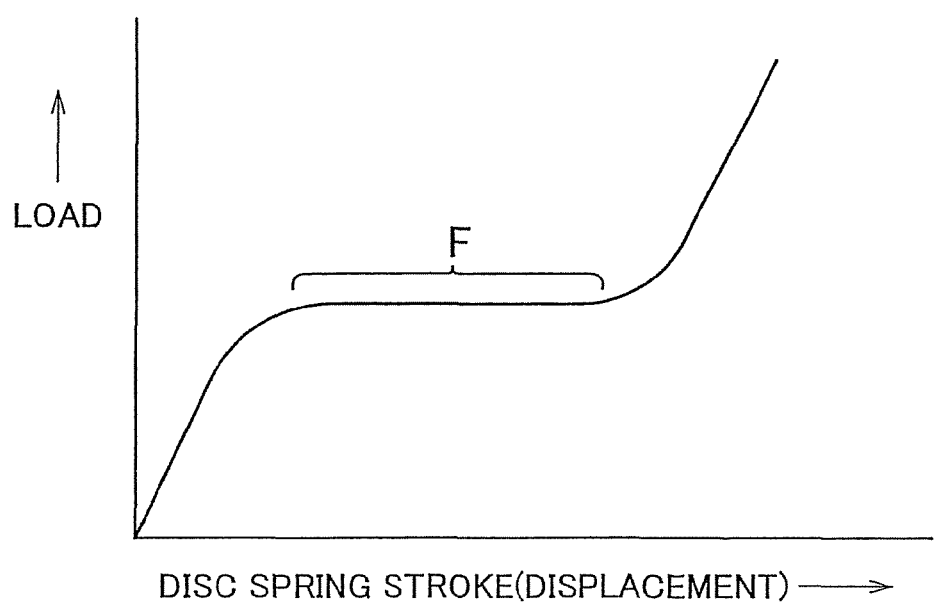
FIG. 7 is a characteristic graph of load versus displacement of an elastic body incorporated into the fuel cell according to the first and second example embodiments of the invention.

As a result, in both the case of the fuel cell (the stack 23 or the single cell 10) and the case of the manufacturing method of the fuel cell (the stack 23 or the single cell 10), the necessary tightening load on the fuel cell stack 23 is able to always be maintained within the target life L. That is, referring to FIG. 3, the operating time h is within the target life L and the broken line B, which indicates the characteristic of a fuel cell that includes the cell modules to which the aging step has been applied, is below the effective stroke lower limit S of the disc spring, and the creep+thermal compression amount is always within the effective stroke S of the disc spring. Thus, even if creep of the stack progresses, the change in stack length can be absorbed by the disc spring 35 so the tightening force can be kept substantially constant. In this case, the load-to-stroke characteristic of the disc spring 35 is one which has a generally flat portion F in the middle, as shown in FIG. 7. Therefore, the stack tightening force can be kept substantially constant by using this generally flat portion F.

Also in FIG. 3, as is evident from the solid. line A indicating the characteristic of related art, creep progresses rapidly early on and then decreases over time. Accordingly, inducing creep in the initial stage may be considered a rational approach because it can be done with a process that takes only as much time as it takes for creep to progress at that stage, i.e., it is a quick process.

Also, in addition to the compression load, a thermal load may also be applied to the cell module in the aging step. As a result, the progress of creep can be accelerated compared with a case in which only a compression load is applied. In addition, creep during actual usage of the fuel cell in which there is a thermal load can be reduced.

In addition, aging is performed by applying at least a compression load to the cell module for a predetermined period of time H (this predetermined period of time is short compared to the target life). As a result, aging can be done quickly.

In this case, the predetermined period of time H is a period of time that can be obtained from FIG. 3 or the like.

Also, the thermal load is applied by running a heated fluid through the fluid flow paths 26, 27, and 28 of the cell module. As a result, the thermal load (temperature load) can be applied both easily, as well as in a state close to the state in which the cell module is actually used.

Further, pressure is applied to the heated fluid, which is effective for accelerating creep of the separator 18 when the separator 18 is a carbon separator.

Next, the structure, operation, and effects of portions specific to each example embodiment of the invention will be described.

First Example Embodiment—FIG. 1

The fuel cell (the stack 23 or the single cell 10) according to the first example embodiment of the invention is manufactured according to FIG. 1. Also, the manufacturing method of the fuel cell (the stack 23 or the single cell 10) according to the first example embodiment of the invention is a manufacturing method according to the steps shown in FIG. 1. The manufacturing method of a fuel cell (the stack 23 or the single cell 10) according to the first example embodiment of the invention is a manufacturing method of a fuel cell, which includes an aging step 103 for progressing through initial creep by applying at least a compression load to a cell module after stacking, and an additional tightening step 104 for additionally tightening the fuel cell stack 23 after the aging step 103.

In the fuel cell (the stack 23 or the single cell 10) and the manufacturing method thereof according to the first example embodiment of the invention, as shown in FIG. 1, the cell modules are laminated and stacked in step 101, and tightened in step 102. An aging process is then applied to the (cell module of the) stack 23 in step 103, after which the stack 23 is then additionally tightened in step 104. Then in step 105 a finished goods inspection is performed on the stack which is then shipped in step 106.

Regarding the operation and effects of the first example embodiment, in FIG. 3, after tightening, aging is performed in step 103 for a predetermined period of time H, during which creep progresses from the starting point to point G. Then in step 104 additional tightening of an amount corresponding to E is performed to bring the creep from point G to point C. Then with use, the creep increases from point C along the broken line B. Even when the target life in operating time h is reached, however, the creep still remains within the disc spring effective stroke S.

As a result, the necessary tightening load of the fuel cell stack 23 is always maintained within the target life.

Also, aging can be applied to the cell module after stacking, which obviates the need to disassemble and then reassemble the stack after the aging step.

Second Example Embodiment—FIG. 2

The fuel cell (the stack 23 or the single cell 10) according to the second example embodiment of the invention is manufactured according to FIG. 2. Also, the manufacturing method of the fuel cell (the stack 23 or the single cell 10) according to the second example embodiment of the invention is a manufacturing method according to the steps shown in FIG. 2. The manufacturing method of a fuel cell (the stack 23 or the single cell 10) according to the second example embodiment of the invention includes an aging step for progressing through initial creep by applying at least a compression load to a cell module before stacking, and an incorporating step for incorporating the cell module into the stack after the initial creep has been progressed.

With the fuel cell (the stack 23 or the single cell 10) and the manufacturing method thereof according to the second example embodiment, as shown in FIG. 2, cell modules are supplied in step 201. The cell module is set, either individually or with other cell modules, in a jig (between an upper jig and a lower jig) in step 202. In step 203, the jig is then tightened and sealed with the cell module. In step 204, an aging process is applied to the cell module. Then in step 205, the cell module is extracted from the jig and separated into single cell modules (in a case where a plurality are provided) which are then incorporated into the stack 23 in step 206 or step 207. In step 206, the cell modules are shipped for use as replacements when a defective cell module has been detected in an inspection such as that in step 105 of FIG. 1. In step 207, the cell modules are shipped to provide a cell module supply for service stations and the like. In the method illustrated in FIG. 2 there is no additional tightening step 104 of the stack, which is different from the method illustrated in FIG. 1.

Regarding the operation and effects of the second example embodiment, in FIG. 3, creep increases from the starting point to point G at the stage where the cell modules are mounted in the jig and aging is applied. Then at the stage where the cell modules are separated and incorporated into a stack, creep decreases from point G to point C. The cell modules are then used, during which creep increases from point C along the broken line B. Even when the target life in operating time h is reached, however, the creep still remains within the disc spring effective stroke S.

As a result, the required tightening load of the fuel cell stack 23 can be maintained throughout the target lifetime of the cell module.

The aging process may also be applied to the cell module before incorporation into the stack, which makes it possible to use the cell module for replacement in the first example embodiment, or for supply at a service station.

The apparatus includes assemblies for implementing the key steps of the method of the second aspect. In particular, assemblies are provided for compressing and heating the cell module in order to progress through initial creep. The apparatus also provides a tightening assembly that tightens the stacked cell module after the aging step is completed. The apparatus may also provide a jig in which a cell module or plurality of cell modules may be set.

The invention claimed is:

1. A manufacturing method of a fuel cell, the fuel cell including a laminated body having a plurality of cell modules and an elastic body, wherein the elastic body absorbs a fluctuation in length of the laminated body caused by a load applied to the laminated body, the method comprising:
   an aging step for progressing through initial creep by applying a compression load to a cell module, wherein the compression load is applied for a predetermined period of time to the cell module in the aging step, and
   a determining step for determining the predetermined period of time based on an absorption limit of the fluctuation of the length of the laminated body by elastic deformation of the elastic body and on a correlative relationship between an amount of change in the thickness of the cell module and an operating time over which the compressed load is applied to the cell module.

2. The manufacturing method according to claim 1, wherein:
   a thermal load is also applied, in addition to the compression load, to the cell module in the aging step.

3. The manufacturing method according to claim 2, wherein:
   the thermal load is applied by running a heated fluid through a fluid flow path in the cell module.

4. The manufacturing method according to claim 3, wherein:
   the heated fluid is pressurized.

5. The manufacturing method according to claim 1, wherein:
   the predetermined period of time is further determined based on a thermal contraction amount of an entire stacked body of the cell module.

6. The manufacturing method according to claim 1, wherein:
   initial creep is progressed in the aging step by applying the compression load to the cell module after stacking the cell module, further comprising:
   a step for additionally tightening the stacked cell module after the aging step.

7. The manufacturing method according to claim 1, wherein:
   initial creep is progressed in the aging step by applying the compression load to the cell module before stacking the cell module, further comprising:
   a step for incorporating the cell module after the initial creep has been progressed as a portion of a cell module stacked body.

* * * * *

UNITED STATES PATENT AND TRADEMARK OFFICE
CERTIFICATE OF CORRECTION

PATENT NO. : 7,855,023 B2
APPLICATION NO. : 12/726085
DATED : December 21, 2010
INVENTOR(S) : Naomichi Akimoto Page 1 of 1

It is certified that error appears in the above-identified patent and that said Letters Patent is hereby corrected as shown below:

<u>Column</u>     <u>Line</u>
    1              3       Insert:

--This is a division of application number 11/918,051 filed 09 October 2007 (now abandoned), which is a 371 national phase application of PCT/IB2006/000853 filed 12 April 2006, claiming priority to Japanese Patent Application No. 2005-115528 filed 13 April 2005, the contents of which are incorporated herein by reference.--

Signed and Sealed this
Twenty-fourth Day of May, 2011

David J. Kappos
*Director of the United States Patent and Trademark Office*